United States Patent [19]

Dilling et al.

[11] 4,355,996
[45] Oct. 26, 1982

[54] AZO DYE REDUCTION IMPROVEMENT OF LIGNIN

[75] Inventors: Peter Dilling, Isle of Palms; Gerald Prazak, Charleston, both of S.C.

[73] Assignee: Westvaco Corporation, New York, N.Y.

[21] Appl. No.: 240,279

[22] Filed: Mar. 4, 1981

Related U.S. Application Data

[60] Division of Ser. No. 133,505, Mar. 24, 1980, which is a continuation-in-part of Ser. No. 126,294, Mar. 3, 1980, abandoned.

[51] Int. Cl.³ .................. C09B 9/00; C09B 67/30; C09B 67/10; C09B 67/40
[52] U.S. Cl. .................................... 8/561; 8/588; 260/124 R; 260/208
[58] Field of Search ............................ 8/524, 561, 588

[56] References Cited

U.S. PATENT DOCUMENTS

| | | |
|---|---|---|
| 1,316,742 | 9/1919 | Robeson . |
| 1,379,175 | 5/1921 | Folsom ............................ 8/561 |
| 3,546,197 | 12/1970 | Benko ........................... 260/124 |
| 3,672,817 | 6/1972 | Falkehag et al. ................. 8/79 |
| 3,726,850 | 4/1973 | Detroit ......................... 260/124 A |
| 3,763,139 | 10/1973 | Falkehag ..................... 260/124 R |
| 4,001,202 | 1/1977 | Dilling et al. ................ 260/124 R |
| 4,153,414 | 5/1979 | Ver Nooy et al. ................ 8/588 |
| 4,184,845 | 1/1980 | Lin ............................... 8/561 |

FOREIGN PATENT DOCUMENTS

2002425 A  2/1979  United Kingdom . .

*Primary Examiner*—Maria Parrish Tungol
*Attorney, Agent, or Firm*—Terry B. McDaniel; Richard L. Schmalz

[57] ABSTRACT

Improved sulfonated lignin surfactants are provided for use as dispersants in dyestuffs. The process for providing the improved surfactants relates to using metals and borate salts to react with the azo dye reducing dihydroxy functions of the lignin molecule through chelation and ester formation mechanisms thereby inhibiting the lignin's azo dye reducing characteristics.

10 Claims, No Drawings

AZO DYE REDUCTION IMPROVEMENT OF LIGNIN

This is a division, of application Ser. No. 133,505, filed Mar. 24, 1980, which is a continuation-in-part of application Ser. No. 126,294 filed Mar. 3, 1980, now abandoned.

BACKGROUND OF THE INVENTION (1) Field of the Invention

This invention relates to improved sulfonated lignin surfactants and their use as dispersants in dyestuffs. More particularly, this invention relates to using metals and borate salts to react with the azo dye reducing dihydroxy functions of the lignin molecule through chelation and ester formation mechanisms thereby inhibiting its azo dye reduction properties.

(2) Description of the Prior Art

Dyestuff compositions comprise, for the most part, a dye cake, i.e., disperse dyes and vat dyes, and a dispersant. These dyestuff compositions are widely used to color both natural and synthetic fibers. In the dyestuff composition, the dispersant serves three basic functions. It assists in reducing the dye particle to a fine size; it maintains a dispersed medium; and it is used as an inexpensive diluent. Generally, the dye dispersants are of two major types, sulfonated lignins from the wood pulping industry and condensed naphthalene sulfonates from the petroleum industry. Each of these surfactants has found application in one or more areas of dye dispersion; however, each dispersing agent possesses one or more undesirable properties.

A detrimental effect caused by the action of select (certain) sulfonated lignins is their ability to reduce azo and bis-azo type dyestuffs. Elimination of the —N=N— double bond by reduction to the hydrazo structure, or if carried further, to a complete rupture of the bond, will cause a destruction of the color body itself. On Disperse Blue 79, this will give the yellowish hydrazo derivative of the color and can conceivably cause a cleavage of the dyestuff at the azo bond giving the two colorless amine components of the dyestuff.

The occurrence of this problem is seemingly on the increase due to the higher temperatures and pressures which are required to overcome dyeability constraints which are imposed by the use of higher molecular weight dyestuffs for man made fibers. Most susceptible are azo type compounds which possess an electron attracting chemical function adjacent to the azo linkage such as $Cl^-$, $Br^-$, $Cn^-$. The sensitivity of the molecule to undergo cleavage increases with increasing electron negativity, being most severe in the instance of $CN^-$.

In kraft lignins, the average available functional groups capable of complex formation are listed in Table I.

TABLE I

AVERAGE FUNCTIONAL GROUPS IN LIGNIN POLYMERS*

| | |
|---|---|
| Phenol | = 4.10 moles |
| Aliphatic Hydroxyl | = 2.86 moles |
| Carbonyl | = 0.67 moles |
| Carboxyl | = 0.90 moles |
| Catechol | = 0.35 moles |

*Based on 1,000 grams lignin.

The catecholic functions can undergo numerous reactions in the presence of oxygen which have the potential to reduce the azo dye color body. Catecholic functions in lignin polymers are subject to oxidation according to the formula:

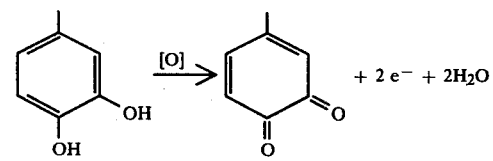

Also, Richter and Wegerle ("Proceedings of the International Wool Textile Research Conference Aachen 1975," Schriftenreiche, Deutsches Wollforschungsinstitut, TH Aachen, Vol. 5, p. 273 (1976)) gave the following sequence of reactions whereby the color loss is based on a reductive mechanism:

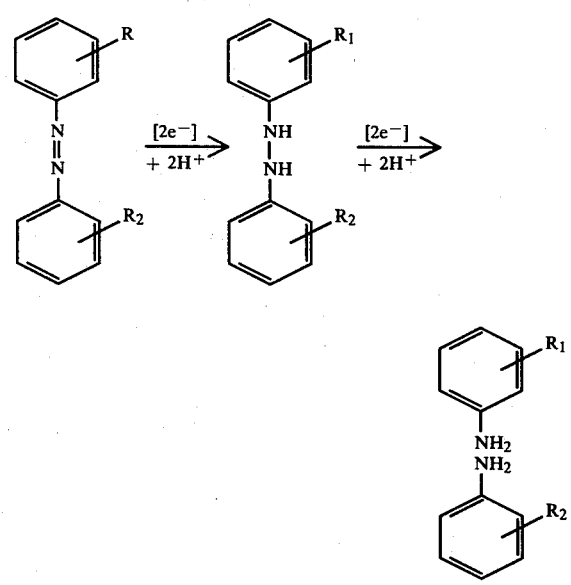

Taking into account that the lignin accommodates an average of 0.35 moles of dihydroxy functions based on 1,000 grams of lignin weight and another series of mono phenolic structures which also can undergo oxidative reactions, this problem can be of serious consequences with sensitive dye molecules.

Many investigations have been undertaken to eliminate or at least circumvent the problem. The most common approach has been to block phenolic structures over Williamson type reactions with reagents such as propylene oxide (U.S. Pat. No. 3,672,817) and epichlorohydrin (U.S. Pat. No. 4,001,202), just to mention a few. Although the results in preventing this phenomenon were excellent, the treatment caused secondary effects. It should be kept in mind that the phenol functionality in lignin is primarily responsible for its outstanding dispersion stability, particularly at the elevated temperatures. Therefore, when blocked, this property is deleteriously affected. Aside from the expense of the blocking reactions, the chemicals in most instances are suspected to be carcinogenic.

Although the methods for treating sulfonated lignins described above offer some advantage during dyeing, none have produced a product possessing the improvements obtained by the products made according to the claimed process.

Thus, it is the general object of this invention to provide a process whereby sulfonated lignins or lignosulfonates may be treated to improve their usefulness as dye dispersants.

Another object of this invention is to provide a process whereby sulfonated alkali lignins or lignosulfonates are treated with certain metal or borate salts to inhibit the azo dye reduction properties of the lignin dispersant.

Other objects, features and advantages of this invention will be seen in the following description of the invention to include specific examples.

SUMMARY OF THE INVENTION

It has now been discovered that another alternative to blocking exists in preventing azo dye reduction, namely, via chelating or ester formation avenues. The advantage of this procedure lies in its extreme simplicity and involves nothing more than the addition of either specific metal salts or borate salts to the lignin.

Therefore, the process of this invention comprises reacting a sulfonated lignin in an aqueous solution, preferably at a solids concentration of from 5% to 35% by weight of lignin, with from 0.01 mole to 0.5 mole, per 1,000 grams of lignin, of a compound selected from the group consisting of salts containing alkaline earth (Group IIa and IIb of The Periodic Chart) metal ions and certain transition elements in the 2+ valence state and borate salts. Specifically, salts containing the metal ions $Mg^{2+}$, $Ca^{2+}$, $Zn^{2+}$, $Cd^{2+}$, $Sr^{2+}$, $Ba^{2+}$, $Ni^{2+}$, $Cr^{2+}$, and $Mn^{2+}$ are included. The inhibition of the azo dye reduction tendencies of the lignin dispersant is believed to result from chelation, in the case of the metal salts, and ester formation, in the case of borate salt addition.

DESCRIPTION OF THE PREFERRED EMBODIMENTS

The lignin material used in the preparation of dye dispersants is obtained from spent pulping liquors, known as black liquor, of the pulp industry where lignocellulosic materials, such as wood, straw, corn stalks, bagasse, and the like, are processed to separate the cellulose or pulp from the lignin. For example, the alkali lignin obtained from the kraft, soda and other alkaline processes is not recovered as a sulfonated product but may easily be sulfonated by reacting the product with a bisulfite or sulfite. In the sulfite pulping process, the lignocellulosic material is digested with a bisulfite or sulfite to obtain a sulfonated residual pulping liquor wherein the sulfonated lignin is dissolved. Likewise, lignin known as "hydrolysis lignin" obtained from the hydrolysis of lignocellulosic materials in manufacturing wood sugars, or "Hydrotropic lignins" derived from hydrotropic pulping processes may be sulfonated and used.

By the term "sulfonated lignin," it is meant any lignin containing at least an effective amount of sulfonate groups to solubilize the lignin in water at neutral or acid conditions. Any of the sulfonated lignins may contain up to one-half of the other materials, such as carbohydrates, phenols and other organic and inorganic compounds. The presence of these other materials results in larger consumption of the reactants used to form the adduct; therefore, some purification of the lignin starting materials is often desirable. Since the chemical structure of lignin varies according to its source and treatment, the term "sulfonated lignin" will be used herein to represent both sulfonated alkali lignin and sulfite liquor lignins from whatever source. The degree of sulfonation present in the lignin is not a controlling factor in making the compound but does control the amount of solubility. The term "sulfonated lignin" is also meant to include alkali lignins that have been sulfomethylated by reaction with sodium sulfite and formaldehyde. One such process is taught by E. Adler et al. in U.S. Pat. No. 2,680,113.

In the present invention, the above-described sulfonated lignin in aqueous solution at a solids concentration of from 5% to 35% by weight of lignin is reacted with salts of specific metals which metal ions in their stable state are divalent (i.e., metal ions which possess two electrons on the outer, or "s", shell). The reaction is believed to result in chelate formation with catecholic functional groups on the lignin molecule thereby preventing release of the two electrons ($2e^-$) by catechol oxidation which normally would contribute to azo dye reduction as described above.

Alternatively, azo dye reduction is inhibited by reacting the sulfonated lignin dye dispersant (at 5% to 35% solids in aqueous solution) with water soluble borate salts. It is envisioned that the interactions between the lignin and the borate result in an ester type formation with the catechol functional groups. Examples of chelation and ester formation on the lignin molecule are given in Table II.

TABLE II
EXAMPLES OF
CHELATION AND ESTER FORMATION

| Chelation | Ester Formation |
|---|---|
|  | 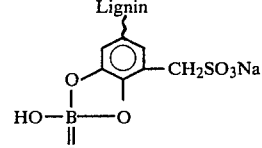 |

The divalent metal ions which can be reacted with sulfonated lignins in the invention process to produce a dye dispersant with improved azo dye reduction properties are the alkaline earth (Group IIa and IIb of The Periodic Chart) metal ions and certain transition elements in the 2+ valence state. Specifically, the metal ions $Mg^{2+}$, $Ca^{2+}$, $Zn^{2+}$, $Cd^{2+}$, $Sr^{2+}$, $Ba^{2+}$, $Ni^{2+}$, $Cr^{2+}$ and $Mn^{2+}$ are included. The metals are added in their salt form, such as calcium chloride ($CaCl_2$), magnesium sulfate ($MgSO_4$) and manganese (II) sulfate monohydrate ($MnSO_4 \cdot H_2O$) to name just a few The amount of metal salt added may vary within wide limits. It will depend on the solubility of the sulfonated lignin and the solids concentration used as well as the water solubility of the particular metal salt employed. At high addition levels, which vary according to the chosen sulfonated lignin and metal salt, the resultant metal salts of lignin exhibit low solubility and are vulnerable to sample thickening, thus reducing shelf life.

The water soluble borate salts of the invention, which when added to sulfonated lignins by the invention process also act to inhibit the azo dye reduction tendencies of the lignins, are any of the metal borates, metal perborates and boric acid. The preferred borate salts are those formed with the metals of Groups Ia, IIa, IIb, IIIa, IVa and Va of The Periodic Chart. The boric acid may be meta-$(HBO_2)$, ortho-$(H_3BO_3)$ or tetra-$(H_2B_4O_7)$. The most common borate salt is borax, or sodium tetraborate decahydrate ($Na_2B_4O_7 \cdot 10\ H_2O$). Another common borate salt is sodium perborate ($NaBO_3 \cdot 4\ H_2O$).

Another unexpected phenomenon, in addition to inhibition of azo dye reduction, was observed when the sulfonated lignins were treated with borax. The borax treatment also resulted in reduced fiber staining. The tendency of sulfonated lignin dye dispersants to stain the fibers is dependent upon the color of the dispersant, the chemical structure of the fiber and the chemical structure of the sulfonated lignin itself. Sulfonated lignin absorbed to the fiber generally results in loss of brightness and in extreme cases, particularly with the lighter color shades, may cause intolerable color distortions. The improvement in fiber staining is realized from the borax treatment in dyeing operations at pH 7.

The process of this invention simply involves the addition of either the above described specific metal salts or any borate salt to an aqueous solution of a sulfonated lignin to produce an improved dyestuff dispersant. The reaction can be conducted at room temperature and atmospheric pressure so no special equipment is required. Preferably the sulfonated lignin solution has a solids concentration of from 5% to 35% and the metal or borate salt is added in an amount of from 0.01 mole to 0.5 mole per 1,000 grams of lignin in solution.

The following test procedures were used to determine the improved usefulness of the products of the invention process:

Azo Dye Reduction Test

1. A standard diazo disperse dye slurry was prepared by mixing one gram of C.I. Disperse Blue 79 in one liter of distilled water.

2. One gram of a sulfonated alkali lignin was taken into 125 milliliters of water and added to that was 100 milliliters of the dye solution mentioned in step 1 above. The pH was adjusted to 5.0-5.5. Then five grams of a pre-scoured Dacron (Type 54) skein was added and placed in a P-300 type autoclave. The autoclave and contents were then placed in a Renigal Dye-Control machine, Model PR, which had been heated to 80° C. After 15 minutes, the temperature was raised to 130° C. and held at this temperature for 45 minutes (15 minutes was required to reach the temperature of 130° C.). At the end the autoclave was cooled and the skein washed with tap water and dried.

Pre-scouring of Dacron Skein

Fifty grams of methyl taurate surfactant was dissolved in 500 milliliters of water. Five grams of this solution was dissolved in 800 milliliters of water and heated to boiling. Skeins were added after removal of boiling solution from the hot plate. After about 15 minutes, the skeins were rinsed thoroughly with water until free of soap.

Reflectance Measurements

Reflectance was recorded with an instrument (Model 610) from the Photovolt Corporation in New York. The machine was allowed to warm up for at least three hours. Care was taken in order that the skein, during measurements, was stretched so that the individual strings were parallel to each other. For higher accuracy, each skein was aligned and measured five times. The average number was taken.

Staining Test

Five grams of dispersant material (1:1 ratio of dispersant to fiber) was taken into 200 milliliters of water, and the pH was adjusted to about 7.0 (4.0). After heating to boiling, a nylon skein was added and periodically turned (two glass rods) for 15 minutes. The fiber was then removed, washed with tap water and dried. Reflectance measurements were taken the same way as described above.

In all of the following examples, sample preparations were prepared by adding the metals or borate salts to the sulfonated lignin polymer in aqueous solution. The resulting composition was stirred for 30 minutes prior to testing.

EXAMPLE 1

The azo dye reduction of a sodium salt of a sulfonated modified kraft lignin (Westvaco Corporation's REAX® 85-A) and the alleviation effects upon addition of specific metal ions are shown in Table III. The lignin solution was 20% solids; and the metals were added in the amount of 0.075 mole, based on the metal, per 1,000 grams of lignin.

Based on light reflectance measurements, the lignin dispersant without metal addition represents the azo dye reduction occurring in the absence of available metal ions. When no lignin and no metals are added, the least amount of azo dye reduction occurs. Based on a scale of 0 to 100 between the least amount of azo dye reduction and the amount of azo dye reduction with lignin alone, the relative effects of metal addition were determined.

TABLE III

| REAX$^R$ 85A + Metal Ion* | Light Reflectance (%) | Azo Dye Reduction (%) |
| --- | --- | --- |
| REAX$^R$ 85A (no metal) | 19 | 100 |
| $Mn^{+2}$ | 14 | 37.50 |
| $Sr^{2+}$ | 16 | 62.50 |
| $Zn^{2+}$ | 13.5 | 31.25 |
| $Ba^{2+}$ | 17 | 75.00 |
| $Mg^{2+}$ | 13.5 | 31.25 |
| $Ca^{2+}$ | 13.5 | 31.25 |
| $Fe^{2+}$ | 22 | 137.50 |
| $Cr^{2+}$ | 17 | 75.00 |
| $Cu^{1+}$ | 32 | 262.50 |
| No lignin added, no metal added | 11 | 0 |

*The metal ion availability was achieved by introduction of the following water soluble salts: $MnSO_4 \cdot H_2O$, $Sr(NO_3)_2$, $ZnSO_4$, $BaCl_2 \cdot 2H_2O$, $MgSO_4$, $CaCl_2$, $FeSO_4$, $CrCl_2$ and $CuCl$, respectively.

It is noted that, of the metals tested, only the iron and copper ions had a deleterious effect on azo dye reduction. All of the other metals tested alleviated a portion of the azo dye reduction caused by the lignin.

EXAMPLE 2

To demonstrate the improvement in fiber staining achievable by the invention process employing borate salts, sodium tetraborate decahydrate was added to lignin sulfonates in the amount of 0.129 mole per 1,000 grams of lignin. After mixing for approximately thirty (30) minutes, the samples were tested, by light reflectance measurements, for fiber staining. Comparisons with skein samples treated with unmodified lignin dispersants are shown in Table IV.

TABLE IV

| Lignin Material | Fiberstaining (% light reflectance) | | | |
|---|---|---|---|---|
| | Without Borax | | With Borax | |
| | pH 4 | pH 7 | pH 4 | pH 7 |
| Highly Sulfonated (1.5 mole* $SO_3^-$) | 62 | 81 | 63 | 82 |
| Low Sulfonated (0.8 mole* $SO_3^-$) | 51 | 73 | 52 | 76 |
| Low Sulfonated Under Super-Atmospheric Pressure (0.8 mole* $SO_3^-$) | 39 | 47 | 39 | 53 |

*Approximate degree of organic bound $SO_3^-$ content in the lignin.

From the data it is clear that a significant improvement in fiber staining is achieved by borax treatment of a low sulfonated lignin at pH 7.

EXAMPLE 3

To demonstrate the azo dye reduction inhibition effect of the borate treatment, borax was added to solutions of the sulfonated lignins of Example 2. After mixing the components for approximately thirty (30) minutes at room temperature, the dispersants were tested for azo dye reduction and reflectance measurements taken. The results are reported in Table V.

TABLE V

| Lignin Material | Light Reflectance (%) | | Azo Dye Reduction | |
|---|---|---|---|---|
| | Without Borax | With Borax | Without Borax | With Borax |
| Low Sulfonated | 17 | 12 | 100 | 16.7 |
| High Sulfonated | 11.5 | 11.5 | 8.3 | 8.3 |
| Low Sulfonated (under super-atmospheric pressure) | 16 | 13 | 83.3 | 66.7 |
| Blank (no lignin added) | 11 | | 0 | |

The most pronounced improvement in azo dye reduction characteristics results from borax treatment of a low sulfonated lignin.

While this invention has been described and illustrated with specific examples and descriptions, it is understood that the invention is not to be limited to the exact details of operation or exact components shown and described herein, as obvious modifications will be apparent to those skilled in the art; and the invention is, therefore, to be limited only by the scope within the claims.

What is claimed is:

1. In a process for making a dyestuff composition with improved fiber staining including the combining of a disperse or vat dye cake and a sulfonated lignin dispersant, the improvement comprising first modifying the sulfonated lignin dispersant by reacting an aqueous solution of a sulfonated lignin at a solids concentration of from 5% to 35% with from 0.01 to 0.5 mole, per 1,000 grams of lignin, of a compound selected from the group consisting of water soluble salts of the divalent metals $Mg^{2+}$, $Ca^{2+}$, $Zn^{2+}$, $Cd^{2+}$, $Sr^{2+}$, $Ba^{2+}$, $Ni^{2+}$, $Cr^{2+}$ and $Mn^{2+}$ and water soluble borate salts.

2. The process of claim 1 wherein the sulfonated lignin is sulfonated alkali lignin.

3. The process of claim 1 wherein the sulfonated lignin is sulfite liquor lignin.

4. The process of claim 1, 2, or 3 wherein the lignin modifying reaction is conducted at room temperature and atmospheric pressure.

5. The process of claim 1, 2 or 3 wherein the borate salts are selected from the group consisting of any of the soluble metal borates, metal perborates and boric acid.

6. The process of claim 5 wherein the boric acid is selected from the group consisting of meta-boric acid, ortho-boric acid and tetra-boric acid.

7. The process of claim 5 wherein the metal borate is sodium tetraborate decahydrate.

8. The process of claim 5 wherein the metal perborate is sodium perborate.

9. The process of claim 1 wherein the sulfonated lignin solution is reacted with a compound selected from the group consisting of calcium chloride, magnesium sulfate, manganese (II) sulfate monohydrate, strontium (II) nitrate, zinc sulfate, barium chloride dihydrate and chromium (II) chloride.

10. The product of the process of claim 1.

* * * * *